United States Patent [19]
Noma

[11] Patent Number: 4,878,527
[45] Date of Patent: Nov. 7, 1989

[54] WHEEL RIM AND ASSEMBLY OF WHEEL RIM AND TIRE

[75] Inventor: Hiroyuki Noma, Hyogo, Japan

[73] Assignee: Sumitomo Rubber Industries, Ltd., Hyogo, Japan

[21] Appl. No.: 143,159

[22] PCT Filed: May 12, 1987

[86] PCT No.: PCT/JP87/00299

§ 371 Date: Feb. 10, 1988

§ 102(e) Date: Feb. 10, 1988

[87] PCT Pub. No.: WO87/06889

PCT Pub. Date: Nov. 19, 1987

[30] Foreign Application Priority Data

May 15, 1986 [JP] Japan ................... 61-112181

[51] Int. Cl.$^4$ .................. B60B 21/10; B60C 15/02
[52] U.S. Cl. .................. 152/379.3; 152/384; 301/95
[58] Field of Search .......... 152/379.3, 379.4, 379.5, 152/384, 381.4, 381.3, 544; 301/95-98

[56] References Cited

U.S. PATENT DOCUMENTS

| | | | |
|---|---|---|---|
| 3,877,503 | 4/1975 | Tangorra et al. | 152/379.4 |
| 3,915,215 | 10/1975 | Nebout | 152/384 X |
| 3,924,670 | 12/1975 | Tangorra et al. | 152/379.3 X |
| 4,148,348 | 4/1979 | French et al. | 152/379.3 |
| 4,209,051 | 6/1980 | Udall | 152/379.3 X |
| 4,260,006 | 4/1981 | Udall et al. | 152/379.3 X |

FOREIGN PATENT DOCUMENTS

| | | | |
|---|---|---|---|
| 0254451 | 1/1988 | European Pat. Off. | 152/379.5 |
| 2455131 | 5/1976 | Fed. Rep. of Germany | 152/379.4 |
| 54-100004 | 7/1979 | Japan . | |
| 0113602 | 5/1987 | Japan | 152/379.4 |
| 2119323 | 11/1983 | United Kingdom | 152/379.3 |

Primary Examiner—Russell D. Stormer
Attorney, Agent, or Firm—Birch, Stewart, Kolasch & Birch

[57] ABSTRACT

The present invention relates to a rim and an assembly of the rim and a tire which are applicable to both a safety tire and a conventional tire. The object of the present invention is to provide a rim and an assembly which enable safe running even when the inner pressure of the tire is lowered or when the vehicle is cornering sharply, and which are usable with not only a safety tire but also with conventional tires. A wheel rim and an assembly of the rim and tubeless tire of the present invention are characterized in that an annular groove (3) is provided axially outside a well (2) in such a manner as to extend in the circumferential direction, and a hump (4) is provided axially outside the annular groove in such a manner as to extend in the circumferential direction. The tubeless tire is characterized by being provided with a toe portion (13) and a hump groove (14) which are adapted to engage the annular groove (3) and the hump (4), respectively.

13 Claims, 4 Drawing Sheets

WHEEL RIM AND ASSEMBLY OF WHEEL RIM AND TIRE

TECHNICAL FIELD

The present invention relates to a rim applicable to both a safety tire and an ordinary tire and an assembly of the rim and the safety tire and, more particularly, to an assembly of a wheel and a tire which enables the safe running of the tire free from the danger of the bead portion of the tire coming off the rim when the inner pressure of the tire is reduced or while the vehicle is turning (cornering) sharply.

BACKGROUND ART

In an assembly of a tire and a wheel rim, the tire bead portion is conventionally held to the beadbase by virtue of the pressing force of the inner pressure of the tire and the frictional force between the beadbase and the rubber of the bottom portion of the tire bead. Therefore, if the inner pressure of the tire is lowered, this holding force is reduced and, specifically, if the vehicle steers sharply with a rapidly lowered inner pressure caused by, for example, a puncture, the rim comes off the bead portion due to a force produced in the transverse direction generated by the turning operation. In particular, a rim provided with a well for mounting a tire involves the danger of bringing about a serious accident when the bead portion of the tire drops into the well and thereby completely comes off the rim. More specifically, the mechanism of the bead portion of a tire coming off the rim can be explained as follows.

The force in the transverse direction caused when a vehicle is cornering deviates the tread portion in the transverse direction relative to the wheel rim and produces deformation on the tread portion. This deformation is transmitted from the carcass to the bead portion of the tire. As a result, in the vicinity of the portion of the tire which comes into contact with the ground, a force is caused in the direction of the rotating axis of the tire (hereinunder referred to as "axial direction") and also a turning moment is produced around the circumference of the bead.

At this time, if the inner pressure of the tire is low, since these forces lift the heel of the bead portion, the frictional force between the bottom portion of the bead and the beadbase, which is the bead portion holding force, is reduced. As a result, the bead portion moves on the tapered bead base inwardly in the axial direction, and the tension of the bead core is also reduced with the movement of the bead portion. The bead portion holding force is therefore rapidly lost, whereby the bead portion drops into the well. To solve this problem, the use of a rim having no well, the use of a rim provided with a hump at the portion which comes into contact with the bead toe so as to prevent the bead portion from moving inwardly in the axial direction, an assembly of a tire and a rim having a hump provided in the beadbase and an annular groove provided at the bead bottom portion of the tire so as to be engaged with the hump (Japanese Patent Laid-Open No. 13802/1974), and an assembly of a tire and a rim having an annular groove provided axially inside the beadbase and a hump provided on the bead toe so as to be engaged with the annular groove (Japanese Patent Publication No. 15007/1982) have been proposed. Among these, the assembly disclosed in the Japanese Patent Publication No. 15007/1982 has an excellent effect as a bead holding mechanism.

Such an assembly, however, has a special configuration at the portion at which the rim comes into contact with the bead portion of the tire. It is therefore impossible to use a conventional tire with such a rim, and if a conventional tire is used by mistake, there is a problem in terms of safety.

Accordingly, it is an object of the present invention to provide a wheel rim and an assembly of a wheel rim and a tire which are capable of maintaining the bead portion holding mechanism of a tire when the inner pressure of the tire is lowered and which are also capable of utilizing a tire having a conventional structure.

DISCLOSURE OF THE INVENTION

In one aspect of the present invention, there is provided a wheel rim characterized by an annular groove which is provided axially outside a well for mounting a tire in such a manner as to extend in the circumferential direction, and a hump which is provided axially outside the annular groove in such a manner as to extend in the circumferential direction.

In another aspect of the present invention there is provided an assembly of a tubeless tire having a pair of bead portions and a wheel rim having a well for mounting a tire, wherein at least one of the bead portions is provided with a non-stretching bead core and a hump groove annularly formed between the bead core and a toe portion which is provided axially inside the bead core in such a manner as to extend inwardly in the radial direction. The wheel rim is provided with an annular groove for receiving the tip of the toe portion and a hump formed axially outside the annular groove.

BRIEF DESCRIPTION OF DRAWINGS

The present invention will become more fully understood from the detailed description given hereinbelow and the accompanying drawings which are given by way of illustration only, and thus, are not limitative of the present invention, and wherein.

BEST MODE FOR CARRYING OUT THE INVENTION

The present invention will be explained in more detail hereinunder with reference to the accompanying drawings.

Figure 1:
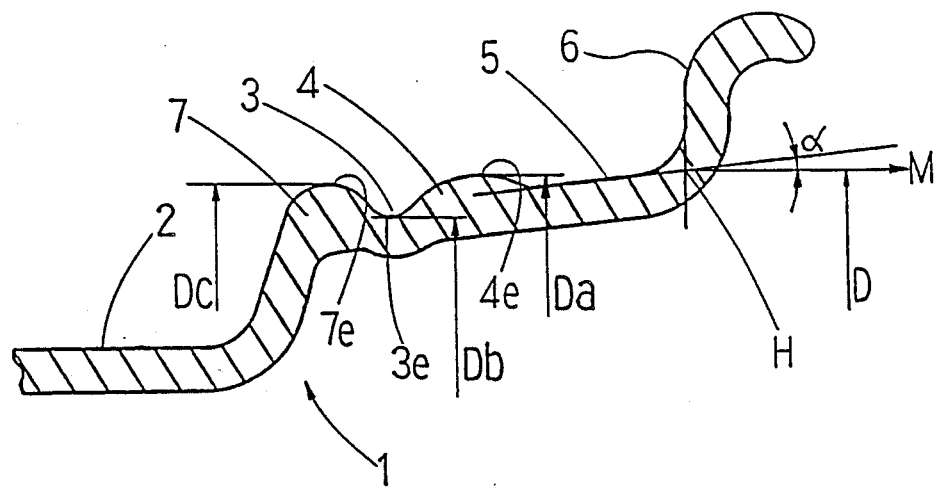
FIG. 1 is a partial sectional view of a wheel rim according to the present invention.

In FIG. 1, a wheel rim 1 is provided with a well 2 for mounting a tire. An annular groove 3 extending in the circumferential direction is provided axially outside the well forming an inner protrusion 7, and hump 4 extending in the circumferential direction of a tire is formed axially outside the annular groove 3. Axially outside the hump 4, a beadbase 5 and a rim flange 6 are provided.

It is possible to facilitate the mounting of a tire on the wheel rim by tapering the beadbase 5 at a predetermined angle $\alpha$ with respect to the axial direction M. The angle $\alpha$ is preferably in the range of 2° to 10°. If it is less than 2°, it is difficult to mount a tire on the wheel rim, while if it exceeds 10°, the bead portion too easily drops into the well, thereby lowering the bead holding force.

The diameters Da, Db, Dc of the wheel rims at the top 4e of the hump, the bottom 3e of the annular groove, and the top 7e of the inner protrusion, respectively, and the diameter D of the beadbase preferably have the following relationships:

$$-3.0 \text{ mm} \leq D - Da \leq +5.0 \text{ mm}$$

$$+2.0 \text{ mm} \leq D - Db \leq +20 \text{ mm}$$

$$0 \text{ mm} \leq D - Dc \leq +5.0 \text{ mm}$$

If $D-Da > +5.0$ mm, $D-Db < +2.0$ mm or $D-Dc > 5.0$ mm, it is difficult to obtain a desirable bead holding mechanism, and if $D-Da < -3.0$ mm or $D-Dc < 0$ mm, the operation of mounting a tire on the wheel rim is difficult. If $D-Db > +20$ mm, it is difficult to produce a wheel rim having adequate durability.

The diameter D of the beadbase here means the diameter of the wheel rim at the base end H which is the intersecting point of the extensions of the beadbase 5 and the inner surface of the flange 6.

It is further possible to facilitate the mount of a tire on the wheel rim by setting the diameters Da, Db and Dc of the rim at the respective points so as to provide the relationship $Da > Dc > Db$.

Figure 3:
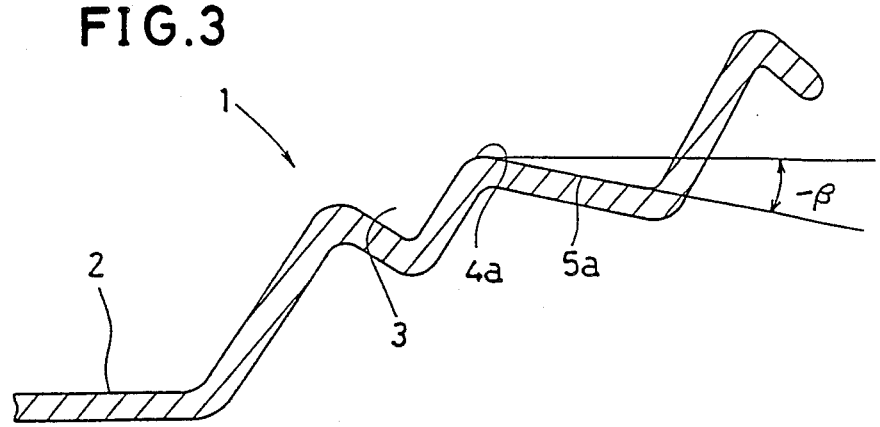
FIG. 3 shows an example of application of the present invention.

FIG. 3 shows another example of application of the present invention. A beadbase 5a is inversely tapered at an angle of $-\beta°$ with respect to the axial direction, and a hump 4a is provided continuously at the inner end of the beadbase 5a without any particular protrusion. The angle $-\beta$ is preferably in the range of $-10°$ to $-2°$. If it is more than $-2°$, it is difficult to obtain the necessary holding force, while if it is under $-10°$, the force applied to the flange portion becomes so large as to necessitate a special configuration for reinforcing the flange portion.

Figure 2:
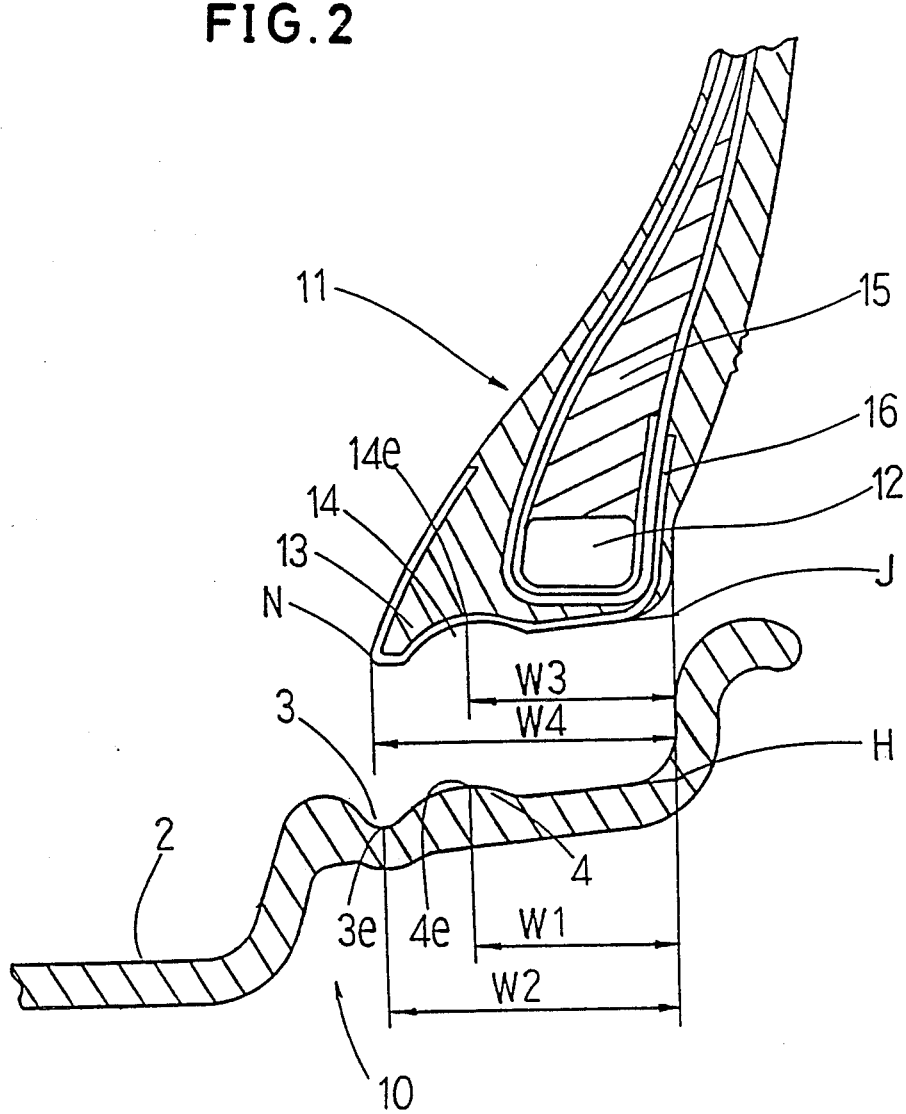
FIG. 2 is a partial sectional view of an assembly of a wheel rim and a tire according to the present invention, wherein the reference numeral 4 represents a hump of the wheel rim, element 3 an annular groove of the wheel rim, element 13 a toe portion of the tire and 14 a hump groove of the tire.

FIG. 2 is a partial sectional view of an assembly of a wheel rim according to the present invention and a tire 11. In FIG. 2, the bead of the tire is provided with a non-stretching core 12, a toe portion 13 formed axially inside of the bead core 12 and extending inwardly in the radial direction, and a hump groove 14 formed axially outside the toe portion 13. The toe portion 13 and the hump groove 14 are engaged with the annular groove 3 and the hump 4, respectively, of the wheel rim, whereby it is possible to prevent the bead portion from being moved inwardly in the axial direction by a force in the transverse direction caused during cornering of the vehicle when the inner pressure of the tire is low.

It is necessary to set the configuration and the dimension of the toe portion 13 and the configuration and the dimension of the hump groove 14 in the correspondence with the configurations and the dimensions of the annular groove 3 and the hump 4, respectively. It goes without saying that a bead apex 15 and a bead reinforcing chafer 16 are applicable to the bead portion in accordance with the purpose, as in a conventional tire. The rubber of the toe portion is preferably a comparatively hard rubber having a hardness of, for example, JIS-A 70° to 95°. It is further possible to form the chafer 16 in such a manner as to envelop the toe portion 13.

It is possible to enhance the bead portion holding force of the assembly according to the present invention by establishing the following relationships between the axial distance W3 from the heel end J of the tire 11 to the bottom 14e of the hump groove 14 and the axial distance W1 from the base end H of the beadbase to the top 4e, and between the axial distance W4 from the heel end J to the end N of the toe portion 13 and the axial distance W2 from the base end H to the bottom 3e of the annular groove 3, respectively:

$$0.5 \leq W3/W1 \leq 1.2$$

$$0.7 \leq W4/W2 \leq 1.2$$

Figure 4:
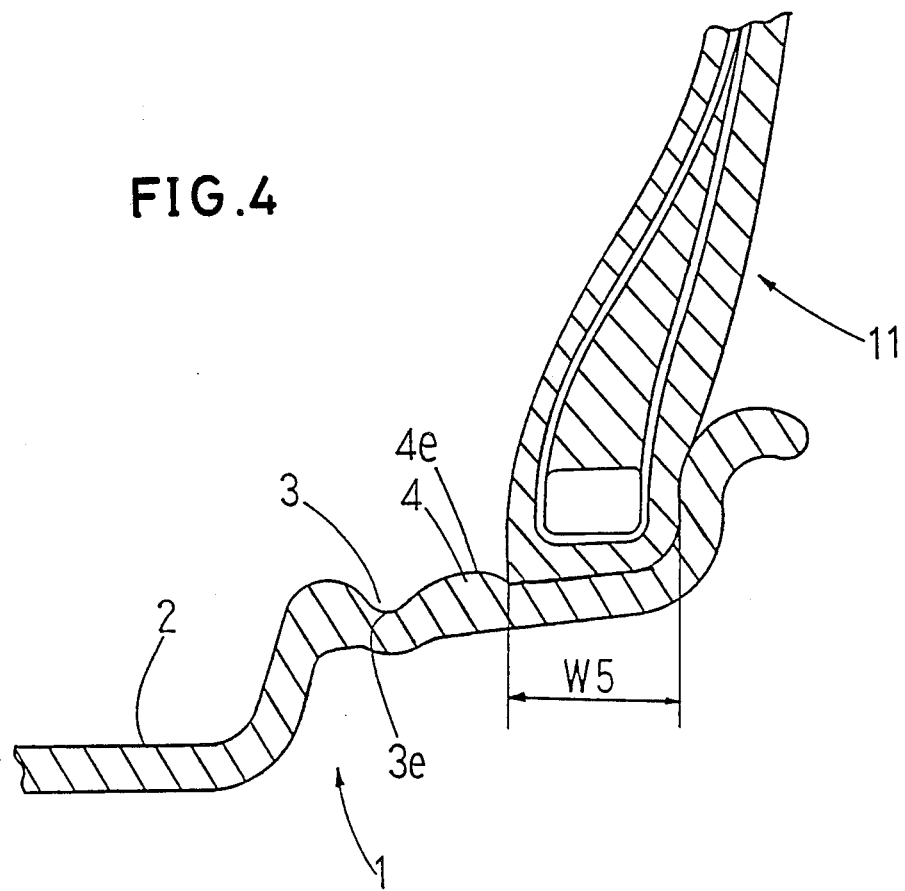
FIG. 4 is a sectional view of an assembly of a wheel rim according to the present invention with a conventional ordinary tire mounted thereon.

FIG. 4 shows an example of a wheel rim according to the present invention which is applied to a conventional tire. The width W5 of the beadbase may be any dimension of a rim which is conventionally standardized. Thus, a wheel rim according to the present invention is advantageous in that although it adopts the above-described special structure, it is applicable to a tire having a conventional structure.

Figure 5:
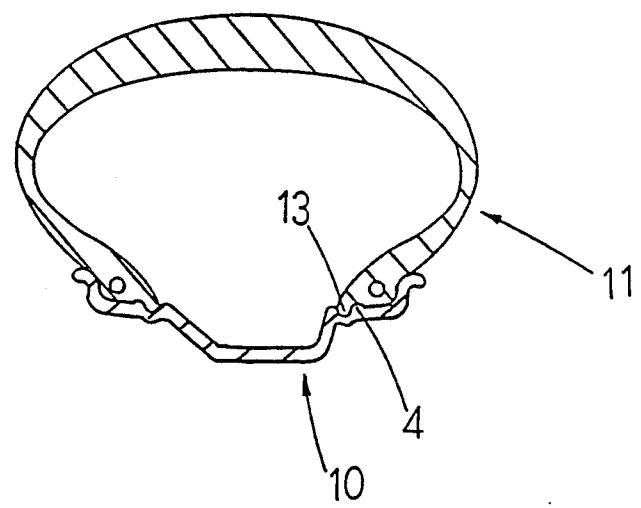
FIG. 5 is a sectional view of an assembly according to the present invention.

FIG. 5 shows a sectional view of an assembly according to the present invention, in which the above-described special structure is adopted to the bead portions on both sides. Needless to say, it is possible to adopt the special structure only to one bead portion.

The present invention is applicable to various vehicles such as passenger cars, motorbikes, tricycles, ATVs, trucks and buses.

The dimensions of the examples of application of the present invention to the tires and wheel rims for passenger cars, a motorbike, and an ATV are shown in Table 1.

TABLE 1

|  |  | Example 1 Passenger Car (1) | Example 2 Passenger Car (2) | Example 3 Motorbike | Example 4 ATV |
|---|---|---|---|---|---|
| Wheel Rim | Size | 6.5 × 15 | 6 × 15 | 4.00 × 17 | 9 × 9.0 |
|  | D | 380.2 mm | 380.2 mm | 433.8 mm | 227.8 mm |
|  | Da | 379.2 mm | 379.2 mm | 433.12 mm | 229.4 mm |
|  | Db | 368.2 mm | 370.2 mm | 423.8 mm | 215.8 mm |
|  | Dc | 376.2 mm | 377.2 mm | 429.8 mm | 223.8 mm |
|  | α | 5° | 5° | 5° | 5° |
|  | W1 | 22.0 mm | 22.0 mm | 16.0 mm | 15.0 mm |
|  | W2 | 32.0 mm | 31.5 mm | 22.0 mm | 25.0 mm |
| Tire | Size | 205/65R15 | 215 SR15 | 150/70-17 | 25 × 12.00-9 |
|  | W3 | 17 mm | 18.5 mm | 15.5 mm | 15 mm |
|  | W4 | 27.5 mm | 28.5 mm | 21.5 mm | 27 mm |

The respective tires and wheel rims were produced according to the specifications shown in Table 1, and indoor tests and running tests were carried out, thereby confirming the effects of the present invention.

Table 2 shows examples of the present invention and a comparative example of tires and wheel rims for a passenger car. Example 1—1 is an assembly of a wheel rim and a tire of the present invention, Example 1-2 an assembly of a wheel rim of the present invention and a conventional tire, and Comparative Example 1 an assembly of conventional wheel rim and tire, the tire being 205/65 R 15 and the rim 6.5 in. ×15 in. in size.

The bead dislodgement forces of these three assemblies were measured by an indoor testing machine when air leakage or bead dislodgement was caused by applying a force in the transverse direction to the tread portions under the three conditions that the inner pressure was 0 kg/cm², 1.0 kg/cm² and 2.0 kg/cm², respectively.

TABLE 2

[Tires and Wheel Rims for a Passenger Car (1)]

|  |  | Example 1-1 | Example 1-2 | Comparative Example 1 |
|---|---|---|---|---|
| Wheel Rim | Size | 6.5 × 15 | 6.5 × 15 | 6½ JJ × 15 |
|  | D | 380.2 mm | 380.2 mm | Conventional |
|  | Da | 379.2 mm | 379.2 mm |  |
|  | Db | 368.2 mm | 368.2 mm | Rim |
|  | Dc | 376.2 mm | 376.2 mm |  |
|  | α | 5° | 5° |  |
|  | W1 | 22.0 mm | 22.0 mm |  |
|  | W2 | 32.0 mm | 32.0 mm |  |
| Tire | Size | 205/65R15 | 205/65R15 | 205/65R15 |
|  | W3 | 17 mm | Conventional | Conventional |
|  | W4 | 27.5 mm | Tire | Tire |
|  | **I.P. |  | *B.D.F |  |
| Indoor Test | 0 | 680 | 380 | 200 |
|  | 1.0 | 1240 | 900 | 810 |

TABLE 2-continued

[Tires and Wheel Rims for a Passenger Car (1)]

|  | Example 1-1 | Example 1-2 | Comparative Example 1 |
|---|---|---|---|
| 2.0 | 2235 | 1770 | 1500 |

*B.D.F. ... Bead Dislodgement Force (kg)
**I.P. ... Inner Pressure (kg/cm²)

Example 1—1 of the present invention exhibited a prominent bead dislodgement capacity. In the case of mounting a conventional tire on the wheel rim according to the present invention a slight effect was also exhibited on the bead dislodgement capacity, as is clear from the results of the Example 1-2, and the assembly was found to be practically usable without a problem.

Table 3 shows examples of the present invention and a comparative example of other tires and wheel rims for a passenger car. Examples 2-1 and 2—2 are assemblies of wheel rims and tires according to the present invention, Example 2-3 an assembly of a wheel rim of the present invention and a conventional tire, and Comparative Example 2 an assembly of a conventional wheel rim and a conventional tire, the tire being 215 SR15 and the rim 6 in. ×15 in. in size. The tires and wheel rims in the examples were produced specifically for a car with four-wheel drive.

TABLE 3

[Tires and Wheel Rims for a Passenger Car (2)]

|  |  | Example 2-1 | Example 2-2 | Example 2-3 | Comparative Example 2 |
|---|---|---|---|---|---|
| Wheel Rim | Size | 6 × 15 | 6 × 15 | 6 × 15 | 6 JJ × 15 |
|  | D | 380.2 mm | 380.2 mm | 380.2 mm |  |
|  | Da | 379.2 mm | 379.2 mm | 379.2 mm | Conventional |
|  | Db | 370.2 mm | 370.2 mm | 370.2 mm | Rim |
|  | Dc | 377.2 mm | 377.2 mm | 377.2 mm |  |
|  | α | 5° | 5° | 5° |  |
|  | W1 | 22.0 mm | 22.0 mm | 22.0 mm |  |
|  | W2 | 31.5 | 31.5 mm | 31.5 mm |  |
| Tire | Size | 215/SR15 | 215/SR15 | 215/SR15 | 215/SR15 |
|  | W3 | 18.5 mm | 18.5 mm |  |  |
|  | W4 | 28.5 mm | 28.5 mm |  |  |
|  | Hardness of Toe Portion | 78° | 64° | Conventional Tire | Conventional Tire |
|  | **I.P. |  | *B.D.F. |  |  |
| Indoor Test | 0 | 690 | 650 | 340 | 200 |
|  | 1.0 | 1730 | 1320 | 930 | 840 |
|  | 2.0 | 1800 | 1800 | 1500 | 1270 |

*B.D.F. ... Bead Dislodgement Force (kg)
**I.P. ... Inner Pressure (kg/cm²)

These examples show that the present invention has prominent effects on the bead displacement capacity as in the examples in Table 2. In the case of mounting a conventional tire on the wheel rim according to the present invention a slight effect was also exhibited on the bead dislodgement capacity, and the assembly was found to be practically usable without a problem. It was also found from Examples 2-1 and 2—2 that a tire having a harder toe portion exhibits a higher effect, specifically, when the inner pressure is low. The effects of the present invention were further confirmed by running tests. The results are shown in Table 4.

TABLE 4

| Tires and Wheel Rims for a Passenger Car (1) | | | Tires and Wheel Rims for a Passenger Car (2) | | | |
|---|---|---|---|---|---|---|
|  | Ex. 1-1 | Comp. Ex. 1 |  |  | Ex. 2-1 | Comp. Ex. 2 |
| *I.P (kg/cm²) | 0.0 | 0.8 | Turning Speed | | ** TN/D | ** TN/D |
|  |  |  | 30 km/h | | 2/NO | 2/NO |
|  |  |  | 35 km/h | | 2/NO | 2/NO |

TABLE 4-continued

| Tires and Wheel Rims for a Passenger Car (1) | | Tires and Wheel Rims for a Passenger Car (2) | |
|---|---|---|---|
| Ex. 1-1 | Comp. Ex. 1 | Ex. 2-1 | Comp. Ex. 2 |
| | 40 km/h | 10/NO | 3/YES |

*I.P. ... Inner Pressure When Bead Dislodgement Occurred
**TN ... Number of Turns
D ... Bead Dislodgement Occurred?

In the left column of Table 4 the results of the tests of the tires and wheel rims for a passenger car of Example 1—1 and Comparative Example 1 in Table 2 are shown. The respective assemblies of the tires and wheel rims were mounted on the right front wheel of a Japanese passenger car having a displacement of 3 l. The inner pressure was gradually reduced in a J turn test in which the wheel was sharply turned left on the circumference of a circle of 25 m in radius at a speed of 60 km/h, thereby causing bead dislodgement. In these tests, bead dislodgement was caused in the assembly of Comparative Example 1 when the inner pressure was 0.8 kg/cm$^2$, while it was not until the inner pressure was 0 kg/cm$^2$, in other words, until the tire completely punctured that bead dislodgement was caused in the assembly of Example 1—1.

In the right column of Table 4 the results of the tests of other tires and wheel rims for a passenger car of Example 2-1 and Comparative Example 2 in Table 3 are shown. After the respective tires and wheel rims were completely assembled, the inner pressure was reduced to 0 kg/cm$^2$. The respective assemblies were mounted on the the right front wheel of a Japanese car with four-wheel drive having a displacement of 4 l. Whether or not bead dislodgement occurred was examined in a J turn test in which the wheel was sharply turned left on the circumference of a circle of 30 m in radius at speeds of 30 km/h, 35 km/h and 40 km/h, respectively. In these tests, bead dislodgement was caused in the assembly of Comparative Example 2 when the wheel turned 3 times at a speed of 40 km/h, while no bead dislodgement was caused in the assembly of Example 2-1 even after the wheel turned 10 times at a speed of 40 km/h.

It goes without saying that application of the present invention does not impair other performances of a tire. As an example, the results of the comparison between the performances of a tire in Examples 1—1 and Comparative Example 1 are shown in Table 5.

TABLE 5

| | Example 1-1 | Comparative Example 1 |
|---|---|---|
| Rolling Resistance (Index) | (100) | (100) |
| Cornering Power [kg/deg](Index) | 151 (101) | 149 (100) |
| Cornering Force @10°[kg](Index) | 433 (100) | 433 (100) |
| Self Aligning Torque Power[kg · m/deg](Index) | 4.5 (102) | 4.4 (100) |
| Repulsive Power Index at the Time of Getting over a Bump (Index) | (99) | (100) |
| Vertical Stiffness (Index) [kg/mm] | 21.2 (101) | 21.0 (100) |
| Lateral Stiffness (Index) [kg/mm] | 15.9 (99) | 16.0 (100) |
| Rolling Radius[mm](Index) | 311 (100) | 311 (100) |

Table 5 shows the values obtained by measuring the respective assemblies of tires and wheel rims in the indoor tests carried out under the conditions that the inner pressure was 2.0 kg/cm$^2$ and the vertical load was 400 kg.

The rolling resistance index is indicated by the index of the the value of the rolling resistance at a speed of 80 km/h, the cornering power by the value of the cornering force at a slip angle of 1°, the cornering force @10° by the value of the cornering force at a slip angle of 10°, and the self aligning torque power by the value of the self aligning torque at a slip angle of 1°, respectively. The repulsive power index at the time of getting over a bump is indicated by the index of the average value of the repulsive power in the vertical direction and in the forward and backward direction produced when getting over a square rod of 10 mm × 10 mm which is attached to a drum at a speed of 20 to 100 km/h. The index in each performance is the value taken on the assumption that the value in Comparative Example 1 is 100.

No degradation caused by the application of the present invention was found in any performance of a tire.

Industrial Applicability

An assembly of a wheel rim and a tire according to the present invention can be produced by a conventional method, and be mounted on a vehicle in the same way as in a conventional tire and wheel rim. Furthermore, an assembly of the present invention enables safe running free from a danger of dislodgement of the bead portion even when the inner pressure of the tire is lowered or when the vehicle is cornering sharply.

What is claimed is:

1. A wheel rim for use with a tire having a conventional bead construction or a bead provided with a radially inwardly extending toe, comprising
   a well for mounting the tire and
   a protrusion located axially outside the well to define a circumferentially extending annular groove disposed axially outward thereof for receiving said radially, inwardly extending toe,
   a hump provided axially outward of the annular groove,
   a beadbase located axially outward of the hump and having a width of a conventionally standardized dimension, and
   a rim flange disposed axially outward of the beadbase,
   whereby the beadbase of the wheel rim can accommodate a conventional tire having a bead devoid of a radially inwardly extending toe or the annular groove, hump and beadbase can accommodate a tire having a bead with said radially inwardly extending toe.

2. A wheel rim for use with a tire having a conventional bead construction or a bead provided with a radially inwardly extending toe, comprising
   a well for mounting a tire,
   a protrusion located axially outside the well,
   a circumferentially extending annular groove located axially outside the protrusion, a circumferentially extending hump located axially outside the annular groove, and a beadbase located axially outside the hump and having a width of a conventionally standardized dimension, wherein the diameter Da at the top of the hump, the diameter Db at the bottom of the annular groove, and the diameter Dc at the top of the protrusion have the following relationship:

$$Db < Dc < Da,$$

whereby the beadbase of the wheel rim can accommodate a conventional tire having a bead devoid of a radially inwardly extending toe, or, the annular groove, hump and beadbase can accommodate a tire having a bead with said radially inwardly extending toe.

3. The wheel rim according to claim 2, wherein the width of the beadbase has conventionally standardized dimensions.

4. The wheel rim according to claim 3, wherein the diameters, Da, Db and Dc and the diameter D of the beadbase satisfy the following relationships:

$$-3.0 \text{ mm} \leq D - Da \leq +5.0 \text{ mm}$$

$$+3.0 \text{ mm} \leq D - Dc \leq +20 \text{ mm}$$

$$0 \text{ m} \leq D - Dc \leq +5.0 \text{ mm}.$$

5. The wheel rim according to claim 2, wherein the diameters Da, Db and Dc and the diameter D of the beadbase satisfy the following relationships:

$$-3.0 \text{ mm} \leq D - Da \leq +5.0 \text{ mm}$$

$$+3.0 \text{ mm} \leq D - Dc \leq +20 \text{ mm}$$

$$0 \text{ m} \leq D - Dc \leq +5.0 \text{ mm}.$$

6. The wheel rim according to claim 2, wherein the beadbase is tapered at an angle with respect to the axial direction of the tire so as to decrease its diameter toward the axially inside thereof.

7. The wheel rim according to claim 2, wherein the beadbase is tapered at an angle with respect to the axial direction of the tire so as to increase its diameter toward the axially inside thereof.

8. An assembly composed of a wheel rim and a tubeless tire, the tubeless tire having a pair of bead portions, at least one of which is provided with a bead core having a heel end and a radially inward extending toe end located axially inside the bead core and further provided with an annular groove between the toe and the heel of the bead, the wheel rim having a well for mounting the tire, a protrusion located axially outside the well, a circumferentially extending annular groove located axially outside the protrusion for receiving the end of the toe of the tire bead, a circumferentially extending hump located axially outside the annular groove so as to be engaged with said groove of the tire bead and a beadbase located axially outside the hump, wherein the diameter Da at the top of the hump, the diameter Db at the bottom of the annular groove of the rim, and having a width of a conventionally standardized dimension, and the diameter Dc at the top of the protrusion having the following relationship:

$$D < D < Da,$$

whereby the beadbase of the wheel rim can accommodate a conventional tire having a bead devoid of a radially inwardly extending toe, or, the annular groove, hump and beadbase can accommodate a tire having a bead with said radially inwardly extending toe.

9. The assembly according to claim 8, wherein the axial distance between the heel end of the tire bead and the bottom of the hump groove is in a range of 50 to 150% of the axial distance between the beadbase end of the wheel rim and the top of the hump, and the axial distance between the toe end and the heel end of the tire bead is in a range of 70 to 150% of the axial distance between the beadbsae end of the wheel rim and the bottom of the annular groove.

10. The assembly according to claim 8, wherein the width of the beadbase has conventionally standardized dimensions.

11. The assembly according to claim 8, wherein the diameters Da, Db and Dc and the diameter D of the beadbase have the following relationships:

$$-3.0 \text{ mm} \leq D - Da \leq +5.0 \text{ mm}$$

$$+3.0 \text{ mm} \leq D - Dc \leq +20 \text{ mm}$$

$$0 \text{ m} \leq D - Dc \leq +5.0 \text{ mm}.$$

12. The tire-rim assembly of claim 8, wherein the axial distance W3 from the heel end of the tire to the bottom of the annular groove, and the axial distance W1 from the outside end of the beadbase to the top midpoint of the hump, and between the axial distance W4 from the heel end to the toe end and the axial distance W2 from the outside end of the beadbase to the middle bottom of the annular groove is represented by the expressions:

$$0.5 \leq W3/W1 \leq 1.2$$

$$0.7 \leq W4/W2 \leq 1.2.$$

13. A tire-rim assembly, comprising a tubeless tire having a bead provided with a bead core and a radially inwardly extending toe located axially inside the bead core and a wheel rim having a well for mounting the tire and a protrusion located axially outside the well to define, axially outwardly of the protrusion, a circumferentially extending annular groove for receiving said radially inwardly extending toe, said tubeless tire being provided with an annular groove disposed between the toe and the heel of the bead, said wheel rim being provided with a hump disposed axially outward of the annular groove to engage with said annular groove of the tire, a beadbase located axially outside the hump, and having a width of a conventionally standardized dimension, and a rim flange located axially outward of the beadbase, said beadbase having a width of a conventionally standardized dimension and can accommodate a conventional tire having a bead devoid of a radially inwardly extending toe, or, the annular groove, hump and beadbase can accommodate a tire having a bead with said radially inwardly extending toe.

* * * * *